Dec. 18, 1934.  M. R. WESTOVER ET AL  1,984,612
FREEZER
Filed July 18, 1932
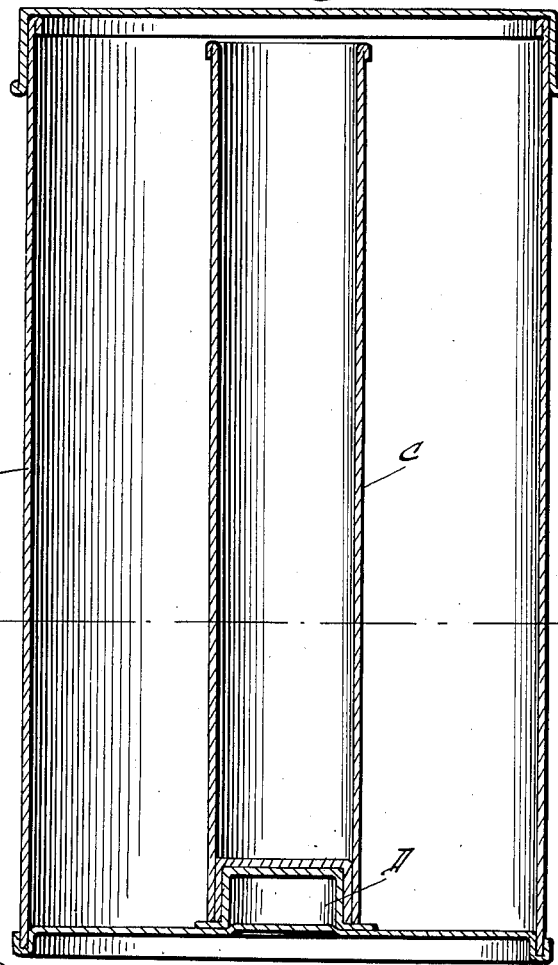
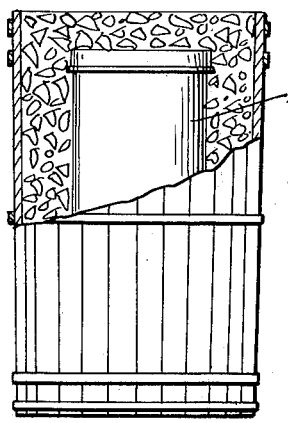
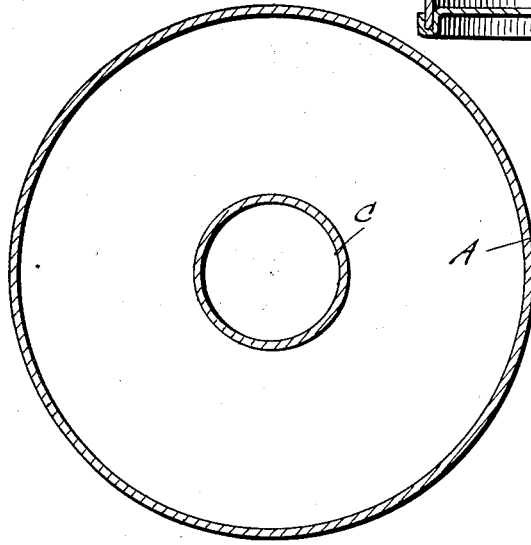
Inventors
Miles R. Westover
Frank Campbell
By Clarence A. O'Brien
Attorney Patented Dec. 18, 1934

1,984,612

UNITED STATES PATENT OFFICE 1,984,612

FREEZER

Miles Raymond Westover and Frank Campbell, Alton, Ill.; said Campbell assignor to I. H. Streeper 3d, Alton, Ill.

Application July 18, 1932, Serial No. 623,232

1 Claim. (Cl. 62—83)

This invention relates to a freezer, the general object of the invention being to provide a can for containing the material to be frozen and having a tubular part at its center which provides means whereby the low temperature will act on the material from the center of the mass as well as from the exterior sides thereof, thus greatly increasing the freezing action and decreasing the time necessary to properly freeze the material which in turn acts to eliminate separation of the ingredients through change in suspension.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation partly in section showing the improved container in a bucket or outer receptacle containing ice for freezing the contents of the container.

Fig. 2 is a sectional view through the container.

Fig. 3 is a section on line 3—3 of Fig. 1.

The improved freezer is designed to reduce the manual effort necessary in the preparation of frozen desserts when the usual ice and salt are used as a freezing agent.

The principle upon which the invention is based is that a frozen liquid constitutes an insulator and deters the dissipation of heat as the thickness of the frozen portion increases; and upon the principle that the flow of heat from a mixture containing fats or other liquids of a density lesser than other liquids in the mixture, there is a tendency for the flow to concentrate the lighter materials at a point distant from the warmest portion, thus effecting a separation that causes a portion of the contents to be inferior in taste and quality. Likewise, there is a tendency for light materials held in suspension to rise to the top.

Upon the premises stated, the problem resolves itself into two parts: (1) As the tendency to separation is stopped when congelation is effected, congelation must be obtained before separation has progressed to a degree affecting the quality of the product. (2) As the flow of heat is the cause of lateral separation, a counteractive force must be applied by causing the heat of dissipation to flow in two directions, one opposing the other.

(1a) As the core of a freezing body requires a period of time to effect congelation much longer than the surrounding materials, elimination of the core reduces the total freezing time by one-half to 75%. In the invention, the introduction of a hollow tube removes the slow freezing core, and reduces the freezing time of the entire body sufficiently that separation of ingredients through change in suspension is eliminated.

(2a) As the air at an initial temperature of 0° F. to 4° F. penetrates to the hollow tube immediately on icing, heat dissipation, both through the core and through the outer walls, is obtained, thus establishing a tendency towards stabilization, or arresting the movement of the ingredients from movement due to the dissipation of the heat.

The drawing shows one manner of carrying out the invention, and in said drawing, the letter A indicates a container for the material to be frozen which is placed in a mixture of ice, salt and the like, contained in a bucket or container B. The container A is provided with a centrally arranged tubular member C which, as before stated, eliminates the central core of the mass of material to be frozen.

The lower end of this tube C fits over a tubular projection D extending upwardly from the central part of the bottom of the container A.

It is not necessary to rotate the container A, though, of course, it can be rotated if desired.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described our invention what we claim as new is:—

In a freezer for ice cream or the like, a container for receiving the material to be frozen, a hollow projection connected with the central portion of the upper face of the bottom of the container and a tubular member of the same cross sectional area throughout and having both ends open with its lower end fitting over the projection and its upper end spaced slightly below the upper end of the container.

MILES RAYMOND WESTOVER.
FRANK CAMPBELL.